United States Patent
Gorelik (10) Patent No.: US 9,239,853 B2
(45) Date of Patent: *Jan. 19, 2016

(54) AUTOMATIC CONSISTENT SAMPLING FOR DATA ANALYSIS

(71) Applicant: International Business Machines Corporation, Armonk, NY (US)

(72) Inventor: Alexander Gorelik, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,658

(22) Filed: Sep. 18, 2014

(65) Prior Publication Data
US 2015/0006542 A1    Jan. 1, 2015

Related U.S. Application Data

(63) Continuation of application No. 14/019,823, filed on Sep. 6, 2013, now Pat. No. 8,892,525, which is a continuation of application No. 13/185,601, filed on Jul. 19, 2011, now Pat. No. 8,856,085.

(51) Int. Cl.
*G06F 17/30* (2006.01)

(52) U.S. Cl.
CPC .... *G06F 17/30289* (2013.01); *G06F 17/30321* (2013.01); *G06F 17/30339* (2013.01); *G06F 17/30371* (2013.01)

(58) Field of Classification Search
CPC ................... G06F 17/30371; G06F 17/30289; G06F 17/30321; G06F 17/30339
See application file for complete search history.

(56) References Cited

U.S. PATENT DOCUMENTS

| 6,272,487 | B1 |   | 8/2001 | Beavin et al. |
| 6,405,187 | B1 | * | 6/2002 | Egan et al. ............................. 1/1 |
| 6,529,901 | B1 | * | 3/2003 | Chaudhuri et al. ................... 1/1 |
| 6,957,225 | B1 |   | 10/2005 | Zait et al. |
| 6,993,516 | B2 |   | 1/2006 | Haas et al. |
| 7,047,230 | B2 |   | 5/2006 | Gibbons |
| 7,127,457 | B1 |   | 10/2006 | Ghazal |
| 7,277,873 | B2 |   | 10/2007 | Brown et al. |
| 7,610,272 | B2 |   | 10/2009 | Zurek |
| 7,647,293 | B2 |   | 1/2010 | Brown et al. |
| 7,685,086 | B2 |   | 3/2010 | Brown et al. |

(Continued)

OTHER PUBLICATIONS

Johnson, G.; "IBM InfoSphere Discovery: The Power of Smarter Data Discovery"; IBM Corporation; www.mdug.org/presentations/discovery; 2011.

(Continued)

*Primary Examiner* — Shiow-Jy Fan
(74) *Attorney, Agent, or Firm* — Mohammed Kashef; Edell, Shapiro & Finnan, LLC (57) ABSTRACT

A method, computer program product, and system for analyzing data within one or more databases, comprising selecting one or more databases for analysis, each database comprising one or more database objects comprising one or more data values, applying a function to each data value in each database object within the one or more databases, where the function produces function values limited to a predetermined range, identifying for analysis the data values producing a certain function value within the predetermined range to form a sampled data set, and analyzing the sampled data set to determine relationships between the database objects within and across the one or more databases.

17 Claims, 6 Drawing Sheets

(56) References Cited

U.S. PATENT DOCUMENTS

| | | |
|---|---|---|
| 8,453,173 B1 | 5/2013 | Anderson et al. |
| 2004/0128290 A1 | 7/2004 | Haas et al. |
| 2004/0193629 A1 | 9/2004 | Mozes |
| 2005/0055369 A1 | 3/2005 | Gorelik et al. |
| 2005/0055673 A1* | 3/2005 | Dias et al. ............... 717/127 |
| 2005/0278357 A1* | 12/2005 | Brown et al. ............. 707/100 |
| 2006/0074875 A1 | 4/2006 | Faunce et al. |
| 2006/0116984 A1 | 6/2006 | Zurek |
| 2006/0184572 A1* | 8/2006 | Meek et al. ............. 707/103 X |
| 2007/0011143 A1 | 1/2007 | Fuh et al. |
| 2007/0143314 A1* | 6/2007 | Thomsen ................. 707/100 |
| 2007/0233648 A1* | 10/2007 | Zuzarte ..................... 707/3 |
| 2007/0282784 A1 | 12/2007 | Modani et al. |
| 2008/0027907 A1 | 1/2008 | Brown et al. |
| 2009/0083215 A1 | 3/2009 | Burger |
| 2009/0094274 A1 | 4/2009 | Gorelik et al. |
| 2009/0193006 A1 | 7/2009 | Herrnstadt |
| 2010/0030809 A1 | 2/2010 | Nath |
| 2010/0174702 A1 | 7/2010 | Au et al. |
| 2011/0208748 A1 | 8/2011 | Chaudhuri et al. |
| 2012/0084287 A1 | 4/2012 | Lakshminarayan et al. |
| 2012/0317134 A1* | 12/2012 | Bourbonnais et al. ........ 707/769 |
| 2013/0024430 A1 | 1/2013 | Gorelik |
| 2013/0226940 A1 | 8/2013 | Gorelik |
| 2014/0012819 A1 | 1/2014 | Gorelik |

OTHER PUBLICATIONS

C.A. Erwin; "Combining Data Profiling and Data Modeling for Better Data Quality"; Transforming IT Management, Technology Brief; erwin.com/whitepapers/detail/combin . . . ; 2009.

Gorelik, A.; "IBM InfoSphere Discovery: The Next Generation of Data Analysis"; IBM Corporation; www.ibm.com/developerworks/data; Jun. 17, 2010.

* cited by examiner

AUTOMATIC CONSISTENT SAMPLING FOR DATA ANALYSIS

CROSS REFERENCE TO RELATED APPLICATIONS

The present application is a Continuation of U.S. Nonprovisional application Ser. No. 14/019,823, filed 6 Sep. 2013, entitled "Automatic Consistent Sampling for Data Analysis," which is a Continuation of U.S. Nonprovisional application Ser. No. 13/185,601, filed 19 Jul. 2011, entitled "Automatic Consistent Sampling for Data Analysis." the disclosures of which are incorporated herein by reference in their entireties.

BACKGROUND

1. Technical Field

The present invention relates generally to data processing, and more particularly to automatic consistent sampling to enable improved matching, discovery of primary key-foreign key relationships and value overlaps in databases.

2. Discussion of Related Art

In today's global economy, the ability of an enterprise to efficiently store, update, and use information can be critical to the enterprise's ability to serve its customers and compete in the marketplace. This information is often stored in databases, in the form of database objects such as data sets, tables, indices, or stored queries. The database objects may be generated and/or received from multiple business units, and may be stored in a variety of storage devices located in multiple locations. These storage devices may include relational databases that store the data objects as tables of data. The relationships between data stored in various tables may be constrained by using primary and foreign keys, which establish and enforce links between data stored in multiple tables, thereby linking information together and providing database normalization. Primary and foreign keys may be identified manually (e.g., by a user) or automatically, however in a very large data set it may be a highly resource-intensive activity to identify and resolve foreign key constraints in an automatic fashion.

BRIEF SUMMARY

Accordingly, embodiments of the present invention include a method, computer program product and a system for analyzing data within one or more databases, comprising selecting one or more databases for analysis, each database comprising one or more database objects comprising one or more data values, applying a function to each data value in each database object within the one or more databases, where the function produces function values limited to a predetermined range, identifying for analysis the data values producing a certain function value within the predetermined range to form a sampled data set, and analyzing the sampled data set to determine relationships between the database objects within and across the one or more databases.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
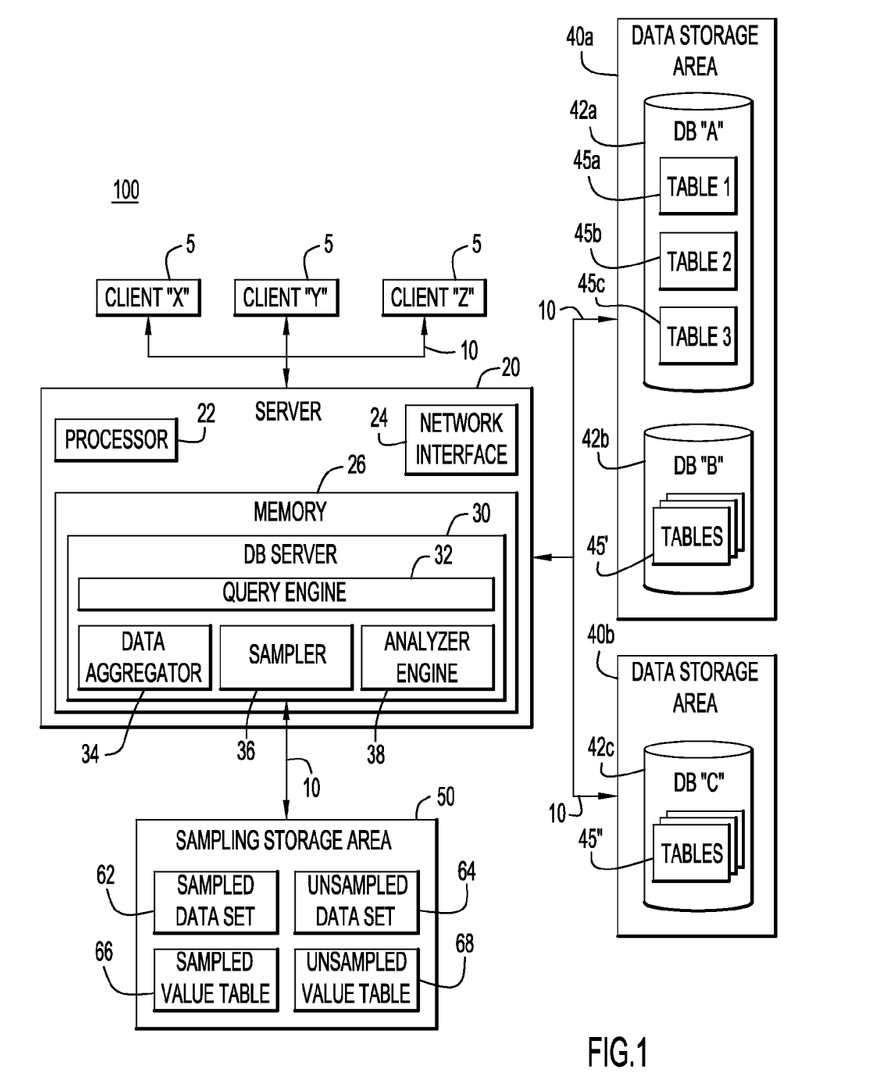
FIG. 1 is a block diagram illustrating a computer system having multiple databases and data connection sources, according to an embodiment of the present invention.

Referring now to the Figures, an exemplary computer system 100 according to embodiments of the present invention is illustrated in FIG. 1. The exemplary computer system 100 comprises a database server 30 that is capable of processing database queries and analyzing database data, which is connected via connections 10 to one or more database clients 5, one or more data storage areas 40 having databases 42 stored therein, and a sampling storage area 50. The system 100 may be a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service. In one embodiment, the database server 30 may be part of, e.g., a database management system such as IBM WebSphere® or IBM InfoSphere™ (WebSphere® and InfoSphere™ are trademarks of International Business Machines Corporation).

Clients 5 may be applications or devices that utilize the databases 42, for example user applications that permit a user to interface with the system, by e.g., entering data into the system, retrieving a database object, or querying a database. As described further with respect to FIG. 2, each client 5 may be a conventional or other computer system or device, such as a thin client, computer terminal or workstation, personal desktop computer, laptop or netbook, tablet, cellular phone, networked television, or other device capable of acting as a client in the described system. Alternatively, the clients 5 may each be a software application that processes data from a corresponding database 42 to provide business or other functions for a particular implementation. These software applications typically include one or more database queries to retrieve and process data from a corresponding database 42.

The database server 30 is resident on a server application or device 20 that comprises a processor 22, network interface unit 24, and memory 26. Processor 22 is, for example, a data processing device such as a microprocessor, microcontroller, system on a chip (SOC), or other fixed or programmable logic, that executes instructions for process logic stored in respective memory (not shown). Each processor 22 may be a multi-processor, and have multiple CPUs, multiple cores, multiple dies comprising multiple processors, etc. Network interface unit 24 enables communication to the computer system 100. Memory 26 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity.

Database server 30 is resident in memory 26 and may comprise components or modules such as a query engine 32, data aggregator 34, sampler 36, and analyzer engine 38. Query engine 32 receives and processes queries to the databases 42, data aggregator 34 aggregates and reports results based on queries back to the users 5, sampler 36 is configured to sample the databases 42, and analyzer engine 38 analyzes and profiles the sampled data. Further details of the operation of the database server 30 are provided with respect to FIGS. 4 through 7.

Data storage areas 40 each comprise one or more databases 42 stored therein. Storage areas 40 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Databases 42 may be implemented by any quantity of any type of conventional or other databases (e.g., network, hierarchical, relational, object, etc.) or storage structures (e.g., files, data structures, web-based storage, disk or other storage, etc.) and may comprise an enterprise data source (e.g., DB2, Oracle, IBM Enterprise Content Management (ECM) systems, ERP systems, etc.), personal and intra-organization data sources (e.g., spreadsheets, databases, etc.), or web-based data sources such as public databases (e.g., tax records, real estate records, court documents, etc.) and the like. The databases may store any desired information arranged in any fashion (e.g., tables, hierarchical, relations, objects, etc.), and may store additional information such as metadata in addition to data.

Although only two data storage areas 40a, 40b, and three databases 42a, 42b and 42c are shown herein, it is understood that more or fewer data storage areas 40 and databases 42 may be present in any particular implementation. For example, in one embodiment there may be more than five data storage areas 40, each storing one or more databases 42, or in another embodiment there may be more than ten data storage areas 40, each storing more than five databases 42, etc. Each database 42 stores or comprises one or more data objects 45, which may be, for example, tables, indices, or stored queries. For example, in the depicted embodiment, database "A" 42a comprises three tables 45a. 45b, 45c, database "B" 42b comprises multiple tables 45' and database "C" 42c on data storage area 40b comprises multiple tables 45". The databases 42 may each comprise numerous tables, for example, in one embodiment a database 42 may store more than five tables, more than ten tables, more than 15 tables, more than 20 tables, more than 25 tables, more than 30 tables, more than 35 tables, etc.

Sampling storage area 50 comprises a sampled data set 62, an unsampled data set 64, a sampled value table 66, and an unsampled value table 68 stored therein. Storage area 50 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Although sampled value table 66 and unsampled value table 68 are referred to herein as "tables", it is understood that they may each be any suitable data storage structure, for example one or more databases implemented on a solid state drive or in a RAM cloud, and need not be tables per se. No particular mechanism for maintaining the data sets 62, 64 is required by the present embodiments. Further details of the data sets 62, 64 and value tables 66, 68 are provided with respect to FIGS. 5 through 7.

Clients 5, processor 22, and DB server 30 may each be implemented in the form of a processing system, or may be in the form of software. They can each be implemented by any quantity of conventional or other computer systems or devices (e.g., computer terminals, personal computers of all types (e.g., including tablets, laptops, netbooks, etc.), or mobile telephones/personal data assistants of all types, and may include any commercially available operating systems for all types of computer hardware and any commercially available or custom software (e.g., browser software, communications software, word processing software, etc.). These systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

It is understood that any of the various components of the system 100 may be local to one another, or may be remote from and in communication with one or more other components via any suitable communication means or devices 10, for example a network such as a WAN, a LAN, Internet, Intranet, mobile wireless, etc. In one embodiment, the clients 5 are located remotely from the database server 30 and are communicatively connected to each other, for example, via the illustrated network connections 10, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement.

The computer system 100 may include additional servers, clients, and other devices not shown, and individual components of the system may occur either singly or in multiples. For example, there may be more than database server 30, more than one processor 22, more than two data storage areas 40, etc., and the functionality of various components (e.g., data aggregator 34, sampler 36 and analyzer engine 38) may be combined into a single device or split among multiple devices. Also for example, the database server 30, storage area 40 and storage area 50 may be located locally to one another (e.g., on the same network or in the some physical computing device), or they may be remotely located from each other as is shown in FIG. 1. In a further example, storage areas 40, 50 and memory 26 may be part of one virtual address space spanning multiple primary and secondary storage devices.

Figure 2:
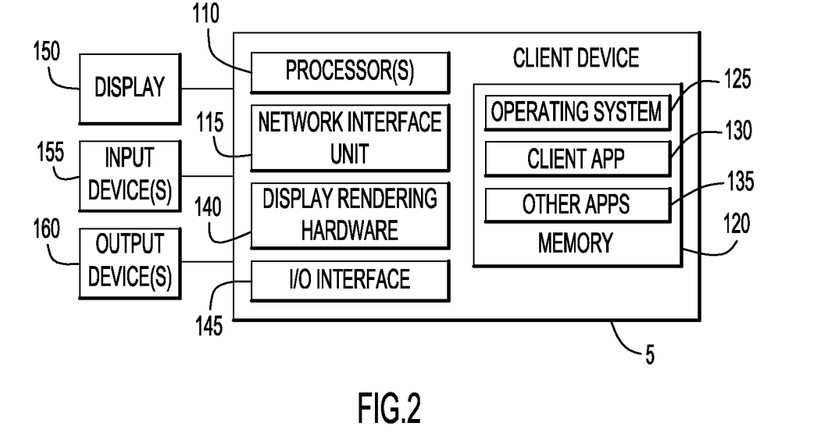
FIG. 2 is a block diagram illustrating a client device that may be used in the computer systems of the present invention.

Referring to FIG. 2, an example of a client device 5 that may be used in system 100 is depicted. Client device 5 comprises one or more processors 110, a network interface unit 115, memory 120, display rendering hardware 140, and input/output interface 145. Resident in memory 120 are operating system 125, client application 130, and optionally other applications 135. The client application 130 provides an interface such as a graphical user interface (GUI) for a user of the client device 5 to interact with the database server 30. Processor 110 is, for example, a data processing device such as a microprocessor, microcontroller, system on a chip (SOC), or other fixed or programmable logic, that executes instructions for process logic stored in memory 120. Network interface unit 115 enables communication to the system 100. Memory 120 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 140 may be a part of processor 110, or may be, e.g., a separate Graphics Processor Unit (GPU).

I/O interface 145 enables communication between display device 150, input device(s) 160, and output device(s) 170, and the other components of client device 5, and may enable communication with these devices in any suitable fashion. e.g., via a wired or wireless connection. The display device 150 may be any suitable display, screen or monitor capable of displaying information to a user of a client device 5, for example the screen of a tablet or the monitor attached to a computer workstation. Input device(s) 160 may include any suitable input device, for example, a keyboard, mouse, trackpad, touch input tablet, touch screen, camera, microphone, remote control, speech synthesizer, or the like. Output device(s) 170 may include any suitable output device, for example, a speaker, headphone, sound output port, or the like. The display device 150, input device(s) 160 and output device(s) 170 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Figure 3:
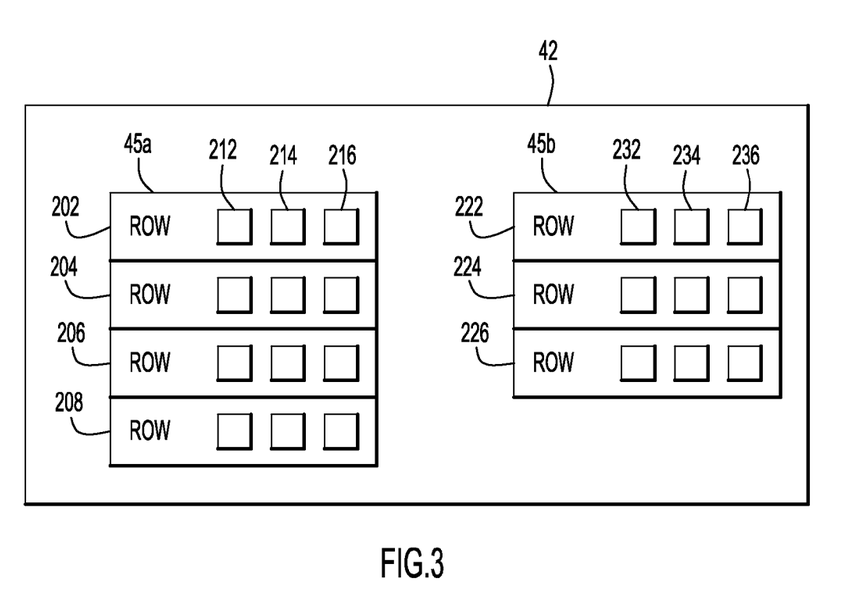
FIG. 3 is a block diagram illustrating table structure in a relational database according to an embodiment of the present invention.

FIG. 3 is a block diagram depicting two tables 45a, 45b in a relational database 42, according to one embodiment of the present invention. In a relational database, a table consists of one or more rows (tuples). Each row is a group or set of column (attribute) values, so that a table may be conceptually visualized as the two-dimensional tables 45 shown in FIG. 3. For example, in FIG. 3, table 45a comprises four rows 202, 204, 206 and 208, each containing three column values for each of three columns 212, 214, and 216, and table 45b comprises three rows 222, 224, and 226, each containing three column values for each of three columns 232, 234, and 236. The columns typically have names that correspond to attributes of the entity represented by the row. For example, table 45a may contain customer data, such that each row 202, 204, 206 and 208 corresponds to a customer, and the columns 212, 214 and 216 correspond to attributes such as Cust_ID, Cust_Name, Cust_Address, etc. Table 45b may contain product data, such that each row 222, 224, and 226 corresponds to a particular product, and the columns 232, 234, and 236 correspond to attributes such as Prod_ID, Prod_Description, and Category. Although FIG. 3 depicts only three and four rows of the tables 45a, 45b, the tables may contain many more rows. For example, each table may comprise hundreds, thousands, millions or billions of rows, and may comprise hundreds, thousands, millions or billions of columns.

In a particularly large data set, for example involving multiple databases, each having many very large tables, it may be difficult for the user of the data set to understand the relationships between the various tables, e.g., the logical schema of the database design. In order to effectively search and use a large data set, it is helpful to identify unique keys that are able to uniquely identify each row in a table. A unique key comprises a single attribute (column) or set of attributes (columns) in the overall data set, where no two distinct rows in a table can have the same value or combination of values for these attribute(s). For example, in a taxpayer database, Social Security Number or Employer identification Number column is a unique key. A key comprising a set of attributes (columns) is known as a "composite key", where the set of attributes together uniquely identify a row. For example, in an employee database that stores FirstName and LastName of employees in two separate columns, the set of columns FirstName and LastName together are a composite key that may be used to uniquely identify a particular employee. Each table in the data set under examination may have multiple unique keys, but generally only one of the unique keys may be a primary key for any given table. A primary key is a type of unique key in a table that may be referenced by a foreign key in another table. The relationships between tables in the data set may be understood by referring to an entity-relationship diagram, which illustrates the various relationships of the tables and keys.

Figure 4:
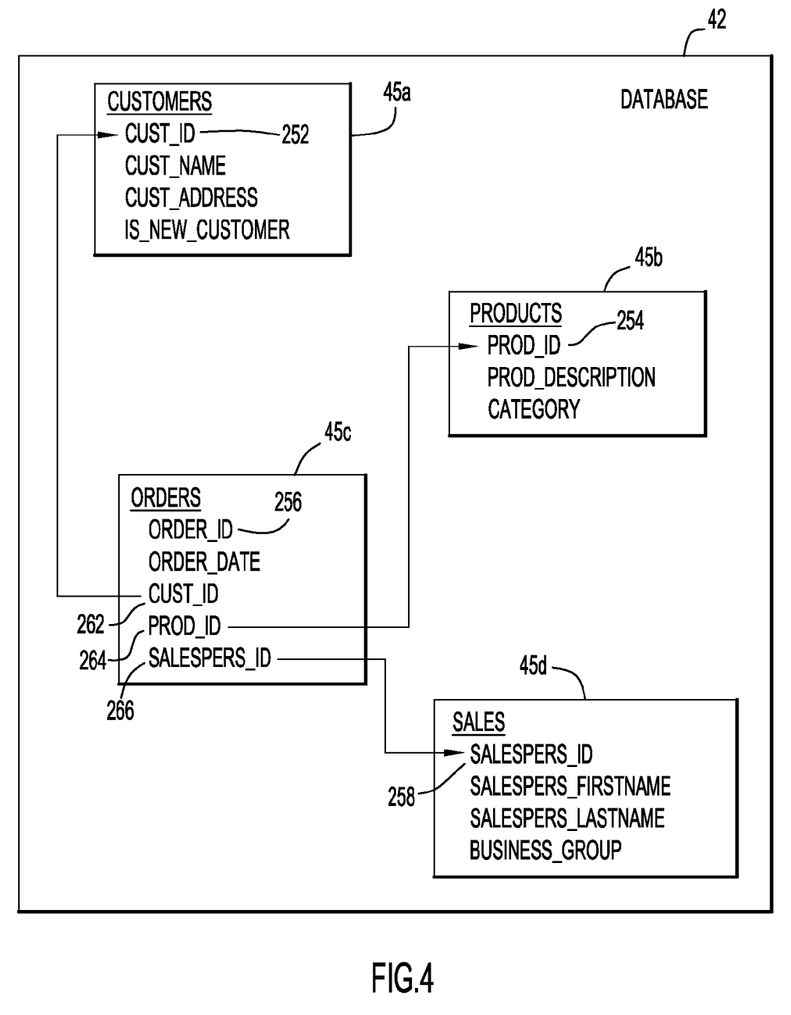
FIG. 4 is a simplified entity-relationship diagram illustrating relationships among data tables in a database including primary key and foreign key relationships, according to an embodiment of the present invention.

For example, FIG. 4 is a simplified entity-relationship diagram illustrating relationships among data tables in a database including primary key and foreign key relationships, according to an embodiment of the present invention. FIG. 4 depicts a database 42 comprising four tables 45a, 45b, 45c and 45d. Each table has a primary key: Customers table 45a has Cust_ID as its primary key 252, Products table 45b has Prod_ID as its primary key 254, Orders table 45c has Order_ID as its primary key 256, and Sales table 45d has SalesPers_ID as its primary key 258. A table may also have a foreign key, which refers to a primary key in another table. The table comprising the foreign key is a referencing (or child) table of the referenced (or master) table comprising the primary key, for example Orders table 45c in the depicted example is a child table of each of the other tables 45a, 45b and 45d. Orders table 45c comprises Cust_ID as a foreign key 262 referencing Cust_ID as a primary key 252 in Customers table 45a, Prod_ID a foreign key 264 referencing Prod_ID as a primary key 254 in Products table 45b, and Salespers_ID as a foreign key 266 referencing Salespers_ID as a primary key 258 in Sales table 45d.

Many production systems do not enforce referential integrity in a database system such as a DataBase Management System (DBMS) for production reasons, but instead enforce it in application logic. Unfortunately, this approach makes it challenging to understand the table relationships, and creates potential for dirty data in the system, such as duplicate primary keys and orphaned foreign keys. In order to understand the schema and to insure data correctness, data analysts are forced to reverse-engineer the schema. There are several significant challenges to discovering primary and foreign key relationships in a large data set, for example a data set comprising both many tables and very large tables. For example, the data set may be simply too large to profile and stage without sampling because system resources are physically or practically incapable of analyzing the data. The analysis is often complicated because in practice database designers often do not specify the keys ahead of time, for example because the designers are unaware of the relationships, data inconsistencies prevent the specification of keys, or because of performance reasons. Also, traditional profiling tools only find potential primary keys and force the user to manually instruct the profiling tool to then find that same key in another table. This means the data analyst must look at each table and potential primary key one by one, painstakingly working through all of the tables. This approach is impractical when dealing with a large data set, e.g., more than 20 tables at a time.

Even if the amount of data to be analyzed is reduced via sampling, sampling around one key may cause other keys to become inconsistent, in that the sample may pick out disconnected values from two related columns and thus give false results. For example, consider the exemplary database of FIG. 4 which has Customers (primary key Cust_ID). Products (primary key Prod_ID) and Orders (foreign keys to Cust_ID and Prod_ID) tables. Assume that the Customers table is sampled around a range of Cust_ID values from 1,000,000 to 2,000,000, and the Products table is sampled around a range of Prod_ID from A00A0000000 and A00B0000000. If the Orders table is sampled using a range on Cust_ID, then the corresponding range of Prod_ID in the Orders table will likely not be within the range of Prod_ID from A00A0000000 and A00B0000000 that was sampled in the Products table. Therefore, in this scenario, it is impossible to identify Orders.Prod_ID as a foreign key to Products.Prod_ID. If the Prod_ID relationship was known beforehand, then the Orders table could have been sampled on both Prod_ID and Cust_ID, however if the relationships are known then there is no need to perform relationship discovery in the first place.

The present embodiments solve this problem by utilizing an automatic consistent random sampling that enables improved matching, discovery of primary key-foreign key relationships and value overlaps in databases. Sampling is performed consistently across all tables and columns in the data set, and is performed on a column level, because column matches may be found based on values tables. Then, given the set of matches, composite keys may be identified using the sampled data. While the example embodiments discussed herein relate to discovering primary-foreign key relationships, the described embodiments may be utilized for other data matching scenarios, for example redundancy assessments, overlap analysis or any other use case that requires matching of exact values.

Figure 5:
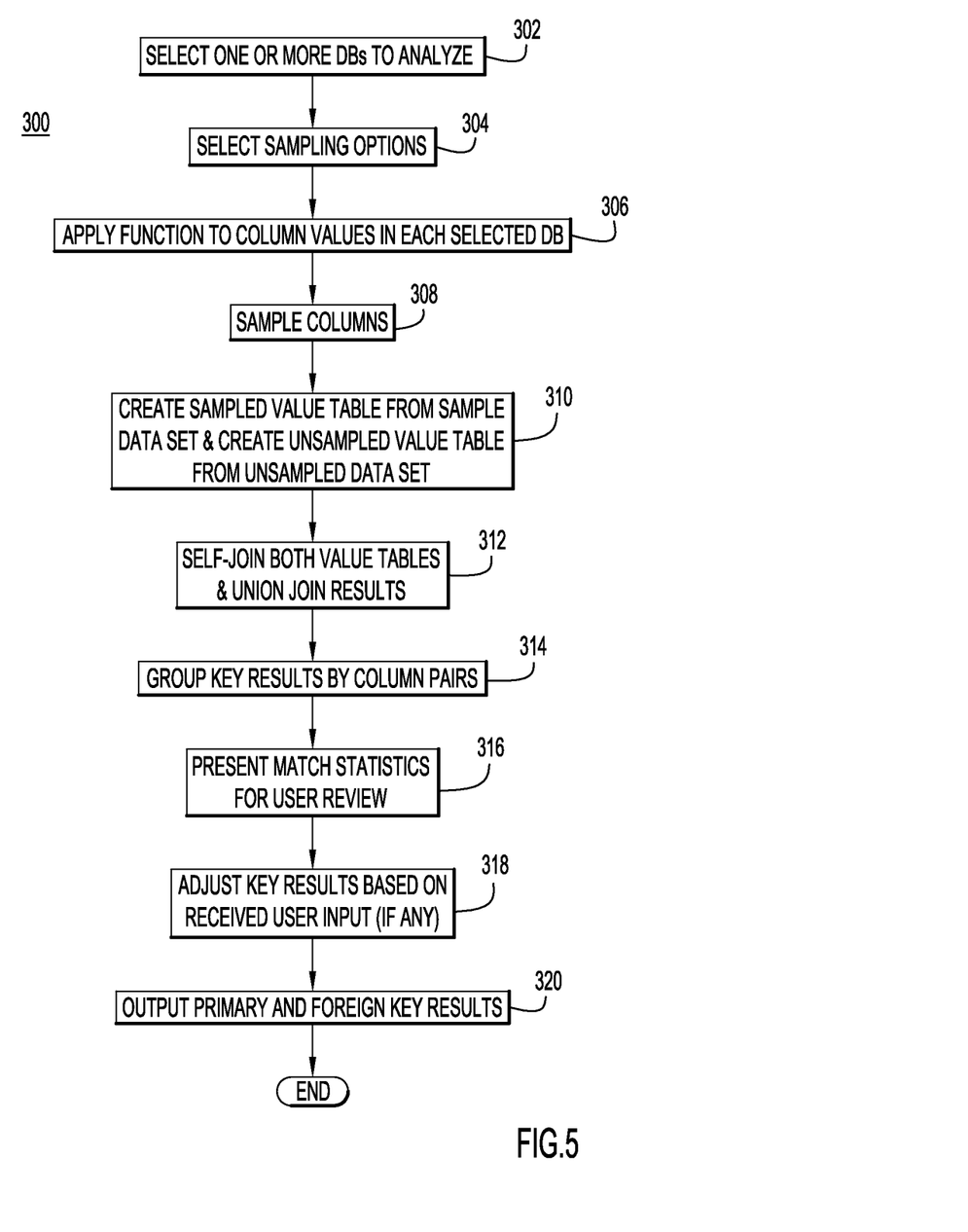
FIG. 5 is a flowchart depicting a process for finding primary key and foreign key relationships in sampled data, according to an embodiment of the present invention.

Referring now to FIG. 5, reference numeral 300 generally designates a flow chart depicting a process for finding primary key and foreign key relationships in sampled data, according to an embodiment of the present invention. Although the following process 300 is described as performed by the DB server 30 and particularly the sampler 36 and analyzer engine 38, it should be understood that this process 300 may be carried out by any suitable server, client or other device, such as, e.g., any suitable component(s) or combination of components of the system 100.

In step 302, the DB server selects a data set (one or more databases) to analyze, for example by presenting a user with a list of available databases and receiving user input selecting databases from the list. In step 304, the DB server selects sampling options, for example as described with reference to FIG. 6. In step 306, the DB server applies a function to every value in every table and column in the data set being sampled. The function may be any suitable hash function. For example, for every value, this hash function will return a function value, that is a number between 0 and N (where N is a prime number such as, e.g., 1001). In step 308, the DB server samples the columns, for example as described with reference to FIG. 7. If the function value returned is 0, the function value is a "sampled value", e.g., it conforms to a sample or is included in a sampled data set 62. If not 0, then the function value is an "un-sampled value", e.g., it is non-conforming or not included in the sample, but instead is included in an unsampled data set 64. All values, whether sampled or unsampled, are kept (e.g., stored in the appropriate data set 62, 64) unless the column is a high cardinality (e.g., columns with a cardinality >1 m) in which case only the sampled (original) values are kept. Because most of the space in the data sets 62, 64 is occupied by high cardinality columns, keeping only sampled values for high cardinality columns should reduce space consumption by roughly 1000 times. It will also significantly improve performance of both profiling and column matching.

Cardinality is a term that refers to the uniqueness of data values in a particular attribute (column) of a database table. A low cardinality column has few unique values, for example column values such as status flags, Boolean values, or the like. In the example database of FIG. 4, column Is_New_Customer in Customer table 45a is a low cardinality column because it has only two possible values, yes and no. A normal cardinality column has more than a few unique values, but there may be some clumps of low cardinality in between stretches of unique values. Typical examples of normal cardinality column values are names, street addresses, vehicle types, etc. In the example database of FIG. 4, column Salespers_FirstName in Sales table 45d is a normal cardinality column, because it may contain non-unique values such as common first names John, Julie and Joe, as well as unique values such as uncommon spelled first names Johnn, Julienne and Josephina. A high cardinality column has many or all unique values, for example identification numbers such as Social Security Numbers or Employer Identification Numbers, email addresses, or User Identification numbers. In the example database of FIG. 4, column Cust_ID in Customers table 45a is a high cardinality column because each value for Cust_ID is unique.

In step 310, after column sampling, the DB server 30 creates a sampled value table 66 from the sampled data set 62, and creates an unsampled value table 68 from the unsampled data set 64. Then, in step 312, the DB server 30 self-joins both tables 66 and 68, and unions the joined results. In step 314, the columns are matched and grouped by column pairs and proposes primary and foreign key results, as well as alternative keys. If desired for a particular implementation, the DB server 30 may in step 316 present the proposed key results, alternative keys, and corresponding match statistics for user review. Match statistics are based on sampled value counts and their matches. For example, if out of 1 m values, the sampled value count is 1050 and the matches are for 1025 of those, the value hit rate is 1025/1050% and can be approximated to 1025/1050*1 m rows. Similarly, if 1050 sampled values represent 1090 rows (selectivity of 1050/1090) and 1025 matching rows represent 1030 rows, the row hit rate is 1030/1090. The user may review the statistics for each automatically discovered key, view good data and dirty data (duplicate primary keys and orphaned foreign keys), consider alternative keys, and modify the results. In step 318, the DB server 30 adjusts its proposed key matches based on received user input (if any), and in step 320 outputs the primary and foreign key results, for example as a list, entity-relationship diagram, etc.

Figure 6:
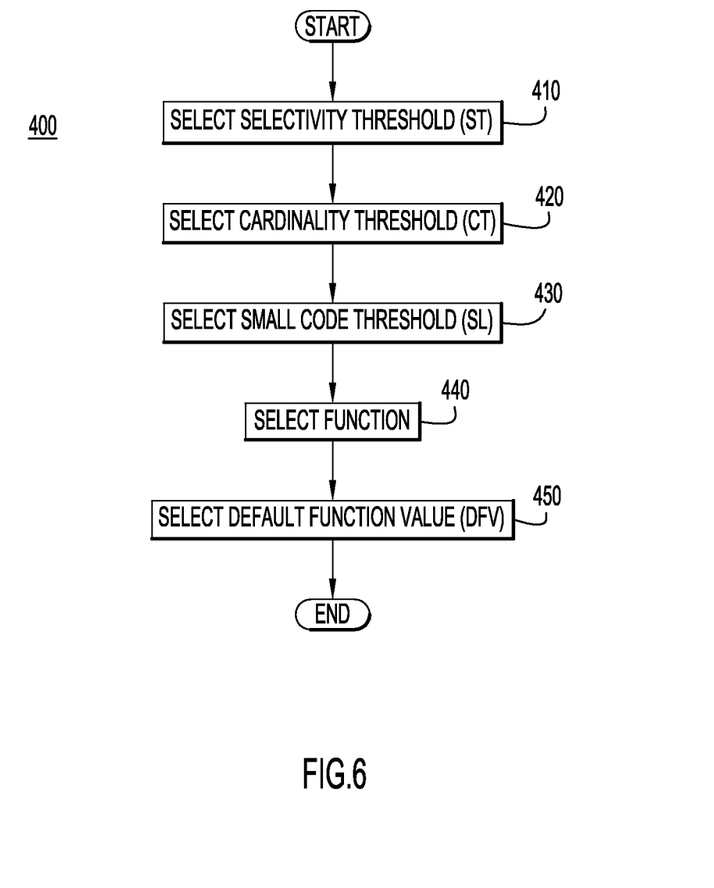
FIG. 6 is a flowchart depicting a process for selecting sampling options, according to an embodiment of the present invention.

Referring now to FIG. 6, reference numeral 400 generally designates a flow chart depicting a process for selecting sampling options, according to an embodiment of the present invention. Although the following process 400 is described as performed by the DB server 30 and particularly the sampler 36 and analyzer engine 38, it should be understood that this process 400 may be carried out by any suitable server, client or other device, such as, e.g., any suitable component(s) or combination of components of the system 100. While the various steps of process 400 are described as performed by the DB server 30, it is understood that such steps may be either automated or in response to user input received from a user of, e.g., a client device 5. Further, any one or more of the steps in process 400 may be omitted in any particular implementation, and the DB server 30 may utilize a default or predetermined selection instead.

In step 410, the DB server selects a Selectivity Threshold (ST), for example based on user input. In terms of a relational database, selectivity is the ratio of unique keys to the total number of rows, or in other terms, the number of rows divided by the cardinality. Selectivity generally ranges from 0 to 1, with 1 being the highest selectivity. A default value for the ST may be any suitable value, for example a value of 0.9. In step 420, the DB server selects a Cardinality Threshold (CT), for example based on user input. The Cardinality Threshold may be set at any suitable level, for example 1000, 10 thousand, 100 thousand, 1 million, or at any other suitable number of unique values in a particular columns. In step 430, the DB server selects a Small Code Threshold or Stringlength (SL), for example based on user input. For example, because a lot of values in the system may be small codes, the Small Code Threshold may be set to consider any string whose length is <=3 a sampled value. In step 440, the DB server selects a function to be used to sample the columns, for example based on user input. The function may be a hash function or any other suitable function. In step 450, the DB server selects a Default Function Value (DFV), for example based on the selected function and user input. For a hash function, the Default Function Value may be a number such as 0 or 1001.

Figure 7:
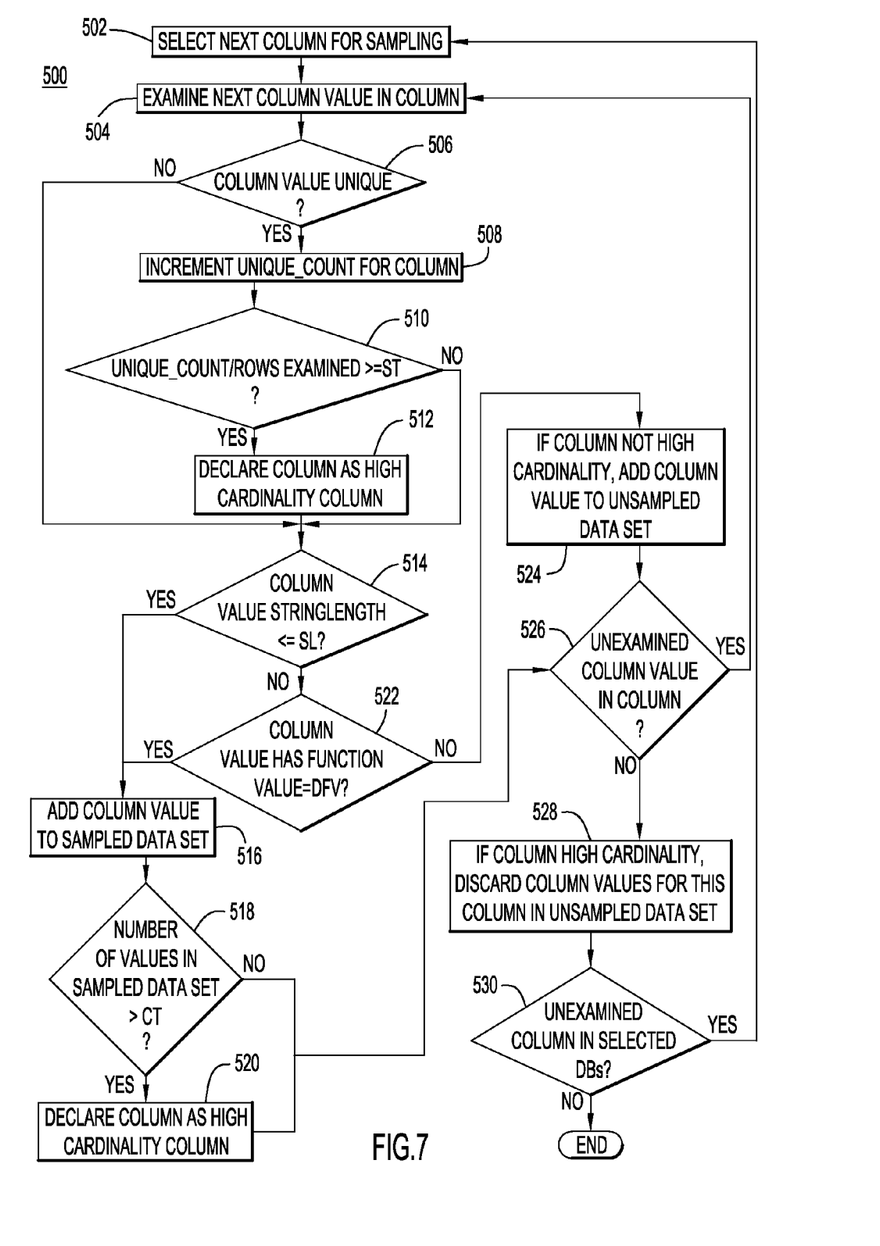
FIG. 7 is a flowchart depicting a process for sampling data from multiple databases, according to an embodiment of the present invention.

Referring now to FIG. 7, reference numeral 500 generally designates a flow chart depicting a process for sampling data from multiple columns of the selected databases, according to an embodiment of the present invention. Although the following process 500 is described as performed by the DB server 30 and particularly the sampler 36 and analyzer engine 38, it should be understood that this process 500 may be carried out by any suitable server, client or other device, such as, e.g., any suitable component(s) or combination of components of the system 100.

In step 502, the DB server selects the next column for sampling, and in step 504, examines the next column value in the column. In step 506 the DB server determines if the column value is unique, and if yes proceeds to step 508 and if no proceeds to step 514. In step 508, the DB server increments a Unique_.Count for this particular column, and in step 510 determines if the selectivity of the column (Unique_Count/Rows Examined) is greater than or equal to the Selectivity Threshold. If yes, then in step 512 the DB server declares the present column as a High Cardinality column, and proceeds to step 514, and if no proceeds to step 514. Steps 506-512 allow for the early detection of High Cardinality columns, in that if the selectivity of the column is less than the Selectivity Threshold, it may be sampled because it can only be a foreign key. If the selectivity of the column is equal to or greater than the Selectively Threshold, then there are several possibilities: 1) this is a true primary key and the column may be declared a high cardinality column and the DB server may stop keeping non-sampled values; or 2) there are just enough unique values to fill a batch and the value distribution is such that the fill each batch with similar selectivity. The second case may be detected if the number of sampled values does not change and the min and max for each batch is the same or within the same range (i.e., the range is not expanding either batch to batch or with respect to absolute maximum).

In step 514, the DB server determines if the column value string length is less than or equal to the Small Code Threshold, if yes proceeds to step 516 and if not proceeds to step 522. In step 516, the DB server adds the original column value to the sampled data set, and in step 520 determines if the number of values in the sampled data set for this column exceeds the Cardinality Threshold. If yes, then in step 520 the DB server declares the present column as a High Cardinality column, and proceeds to step 526, and if no proceeds to step 526.

In step 522, the DB server determines if the function value for this column value is equal to the Default Function Value, if yes proceeds to step 516 as previously described, and if not proceeds to step 524. In step 524, the DB server adds the column value to the unsampled data set if the present column has not been declared a High Cardinality column, and then proceeds to step 526. In step 526, the DB server determines if there are any unexamined column values remaining in the present column, if yes returns to step 504 to examine the next value, and if not proceeds to step 528. In step 528, if the column has been declared a High Cardinality column, any column values saved for this column in the unsampled data set are discarded. This step is necessary because the DB server may be saving non-sampled values for high cardinality columns before we detect that the columns are high cardinality. Then in step 530, the DB server determines if there are any unexamined columns remaining in the selected databases, if yes returns to step 502 to examine the next column, and if not the process ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or in reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of analyzing data within one or more databases, comprising:
   selecting one or more databases for analysis, each database comprising one or more database tables with one or more columns including one or more data values;
   applying a function to each data value of one or more columns in the database tables within the selected one or more databases, wherein the function produces different function values for the data values limited to a predetermined range;
   identifying for analysis the data values producing a same function value within the predetermined range to form a sampled data set;
   analyzing the sampled data set by matching data values from columns of different database tables within the sampled data set to determine key relationships between columns of the database tables within and across the selected one or more databases, wherein the key relationships between the columns of the database tables are determined without key relationships between the columns of the database tables being known beforehand; and
   retrieving data from a plurality of the database tables of the selected one or more databases based on the determined key relationships.

2. The method of claim 1, wherein said analysis further comprises determining one or more primary key-foreign key relationships between the database tables within and across the selected one or more databases.

3. The method of claim 1, further comprising:
   identifying for analysis the data values that do not produce the same function value to form an unsampled data set, unless the data values are in a high cardinality column; and
   analyzing the unsampled data set with the sampled data set to determine relationships between the database tables within and across the selected one or more databases.

4. The method of claim 3, wherein a column is a high cardinality column if a number of data values in the column that produce the same function value exceeds a predetermined cardinality threshold.

5. The method of claim 3, wherein a column is a high cardinality column if a number of unique data values in the column divided by the number of data values in the column exceeds a predetermined selectivity threshold.

6. The method of claim 1, wherein the function is a hash function.

7. A computer program product for analyzing data within one or more databases, comprising:
   a computer readable storage medium having computer readable program code embodied therewith, the computer readable program code comprising computer readable program code configured to:
   select one or more databases for analysis, each database comprising one or more database tables with one or more columns including one or more data values;
   apply a function to each data value of one or more columns in the database tables within the selected one or more databases, wherein the function produces different function values for the data values limited to a predetermined range;
   identify for analysis the data values producing a same function value within the predetermined range to form a sampled data set;
   analyze the sampled data set by matching data values from columns of different database tables within the sampled data set to determine key relationships between columns of the database tables within and across the selected one or more databases, wherein the key relationships between the columns of the database tables are determined without key relationships between the columns of the database tables being known beforehand; and
   retrieve data from a plurality of the database tables of the selected one or more databases based on the determined key relationships.

8. The computer program product of claim 7, wherein the computer readable program code is further configured to:
   determine one or more primary key-foreign key relationships between the database tables within and across the selected one or more databases.

9. The computer program product of claim 7, wherein the computer readable program code being further configured to:
   identify for analysis the data values that do not produce the same function value to form an unsampled data set, unless the data values are in a high cardinality column; and
   analyze the unsampled data set with the sampled data set to determine relationships between the database tables within and across the selected one or more databases.

10. The computer program product of claim 9, wherein a column is a high cardinality column if a number of data values in the column that produce the same function value exceeds a predetermined cardinality threshold.

11. The computer program product of claim 9, wherein a column is a high cardinality column if a number of unique data values in the column divided by the number of data values in the column exceeds a predetermined selectivity threshold.

12. The computer program product of claim 7, wherein the function is a hash function.

13. A system for analyzing data within one or more databases, comprising:
   one or more databases, each database comprising one or more database tables with one or more columns including one or more data values stored in memory; and
   a processor configured with logic to:
   select one or more databases from the one or more databases for analysis;
   apply a function to each data value of one or more columns in the database tables within the selected one or more databases, wherein the function produces different function values for the data values limited to a predetermined range;
   identify for analysis the data values producing a same function value within the predetermined range to form a sampled data set;
   analyze the sampled data set by matching data values from columns of different database tables within the sampled data set to determine key relationships between columns of the database tables within and across the selected one or more databases, wherein the key relationships between the columns of the database tables are determined without key relationships between the columns of the database tables being known beforehand; and
   retrieve data from a plurality of the database tables of the selected one or more databases based on the determined key relationships.

14. The system of claim 13, wherein the processor being further configured with logic to:
   determine one or more primary key-foreign key relationships between the database tables within and across the selected one or more databases.

15. The system of claim 13, wherein the processor being further configured with logic to:
   identify for analysis the data values that do not produce the same function value to form an unsampled data set, unless the data values are in a high cardinality column; and
   analyze the unsampled data set with the sampled data set to determine relationships between the database tables within and across the selected one or more databases.

16. The system of claim 15, wherein a column is a high cardinality column if a number of data values in the column that produce the same function value exceeds a predetermined cardinality threshold, or if a number of unique data values in the column divided by the number of data values in the column exceeds a predetermined selectivity threshold.

17. The system of claim 13, wherein the function is a hash function.

* * * * *